Sept. 7, 1954

J. D. CONTI 2,688,356

MULTIPLE UNIT LAMINATING APPARATUS

Filed Aug. 3, 1951

INVENTOR.
JOHN D. CONTI
BY
Thomas R. O'Malley
ATTORNEY.

Sept. 7, 1954 J. D. CONTI 2,688,356
MULTIPLE UNIT LAMINATING APPARATUS
Filed Aug. 3, 1951 4 Sheets-Sheet 2

INVENTOR.
JOHN D. CONTI
BY
Thomas R. O'Malley
ATTORNEY.

INVENTOR.
JOHN D. CONTI

Sept. 7, 1954  J. D. CONTI  2,688,356
MULTIPLE UNIT LAMINATING APPARATUS
Filed Aug. 3, 1951  4 Sheets-Sheet 4

INVENTOR.
JOHN D. CONTI
BY
Thomas R. O'Nally
ATTORNEY.

Patented Sept. 7, 1954

2,688,356

UNITED STATES PATENT OFFICE 2,688,356

MULTIPLE UNIT LAMINATING APPARATUS

John D. Conti, Elkins Park, Pa., assignor to American Viscose Corporation, Wilmington, Del., a corporation of Delaware Application August 3, 1951, Serial No. 240,215

16 Claims. (Cl. 154—1)

1

This invention relates to a multiple unit laminating apparatus. More particularly the invention is concerned with the preparation of samples for testing adhesives, glues, and the like. The apparatus of the present invention is designed to prepare a plurality of film samples each of which comprises two films or sheets bonded together with various adhesives, and the like, which are to be tested. By means of the present invention a plurality of samples to be tested are prepared regularly at predetermined intervals in a continuous manner.

The apparatus is primarily designed for the preparation of laminated samples in which liquid adhesives and glues are employed, although the apparatus may be readily adapted to laminating sheet materials which have a thermoplastic coating on the surfaces thereof, as hereinafter more fully explained. The present invention may be employed in sealing or laminating all types of film or sheet materials, whether fibrous or non-fibrous, such as paper, textile fabrics, films of regenerated cellulose, cellulose ethers and esters, resinous materials, such as vinyl chloride, polyvinylacetate, urea- and phenol-aldehyde resins, polyamides, and the like, and copolymers of the same, casein, alginates, etc. For purposes of simplicity of description, however, the invention will be described as it is applicable to the preparation of laminated samples for testing various adhesives, glues, and the like, formed from sheets or films of regenerated cellulose made from viscose in the usual manner, it being understood that this is merely intended in an illustrative sense and the invention is not to be limited thereby but only insofar as the same may be limited by the appended claims.

Various types of liquid adhesives are employed in sealing regenerated cellulose film or cellophane when shaping the same into bags, envelopes, various packages, and the like. Certain of these adhesives are more suitable for packaging particular materials than others and the packages or bags, and the like, must have varying strength seals therein depending upon the weight of the material to be packaged. It is therefore desirable to know the potentialities of a particular adhesive or glue before use thereof with respect to the strength of the seal, etc., that is obtainable therewith.

It is the present practice to test various adhesives on the production machines, that is, bag forming and envelope forming and other packaging machines. This necessarily entails a great deal of loss of material as well as increased expense. In addition, it is time consuming since only one adhesive can be tested at a time and then the machine must be cleaned before testing the next adhesive. It is desirable to have an apparatus which will simultaneously apply a plurality of adhesives to distinct areas of a sheet material and form the seals with a minimum loss of time and material.

It is an object of the present invention to overcome the aforementioned difficulties and disadvantages and provide an apparatus which is capable of laminating sheet material with a plurality of adhesives at the same time and thus produce a plurality of samples for adhesive testing purposes. It is another object of the invention to provide an apparatus for producing a plurality of samples of laminated sheet material bonded with various adhesives regularly at predetermined intervals in a continuous manner. Other objects and advantages of the invention will be apparent from the description thereof hereinafter.

In general, the objects of the present invention are accomplished by passing a sheet of regenerated cellulose film of any desired width into contact with a series of glue or adhesive-applying rolls arranged in a row extending transversely of the path of travel of the film. These glue-applying rolls are brought into contact with the sheet or film at regular predetermined intervals thus applying to the film a strip or length of adhesive or glue of any desired length and width. The film is then passed along its path and brought into superposed contact with a second sheet or film of regenerated cellulose and the two superposed films with the adhesive therebetween are passed over a roller positioned above which are a series of knives or slitting blades which cut the film into longitudinal strips, each knife cutting the film between adjacent strips of adhesive. The cut strips then pass between pressure rollers which also act as drawing rollers and under a guillotine knife blade which periodically cuts the film or strips of sealed film in the space between successive applications of adhesive. In this manner, there is produced a series of individual samples, successively at predetermined intervals in a continuous manner. As many applicators as desired may be employed depending of course upon the width of film being fed through the apparatus. Each glue applying wheel passes through a glue pot as it revolves and a separate adhesive may be employed in each of the pots.

In connection with the following detailed description of the invention, reference should be had to the accompanying drawing which is merely intended to be illustrative and not limitative, and in which.

Figure 1:
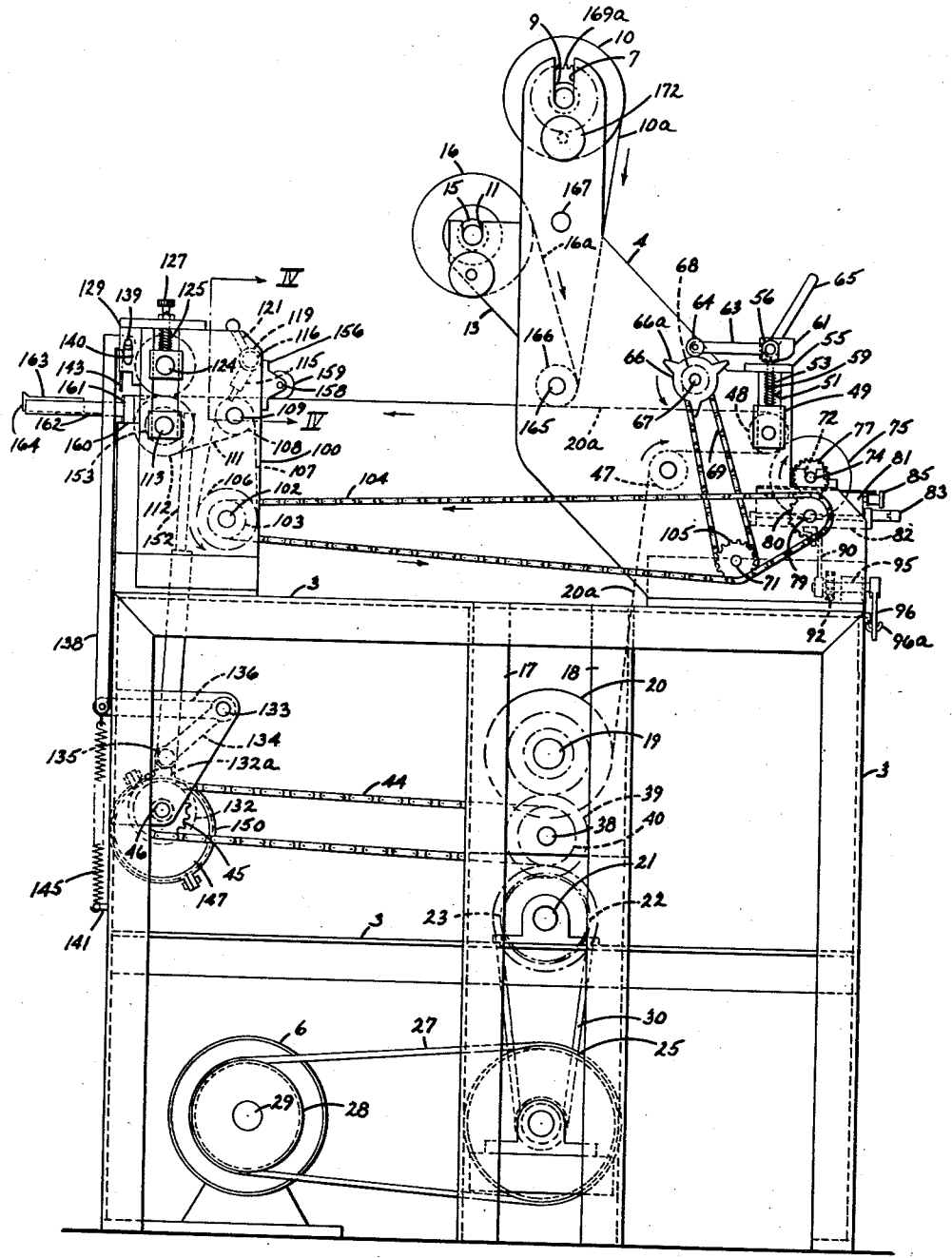
Figure 1 is a side elevation view of a preferred form of the apparatus.
Figure 2:
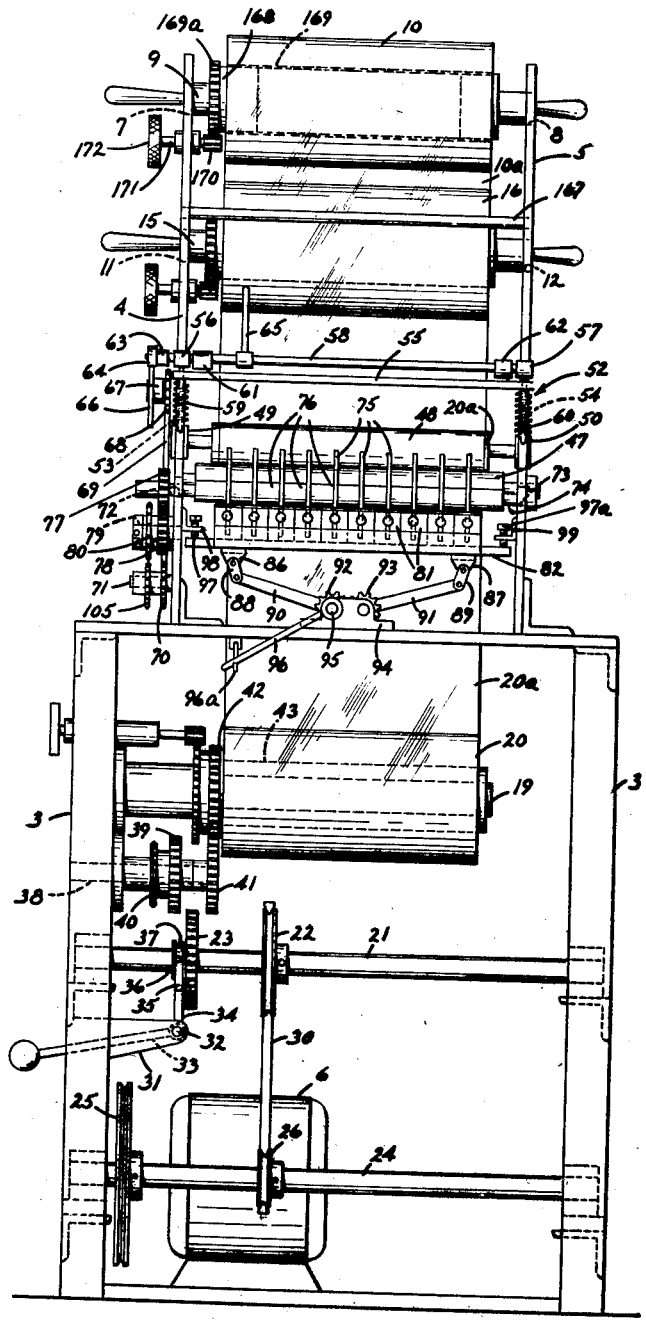
Figure 2 is a right side elevation view of Figure 1.
Figure 3:
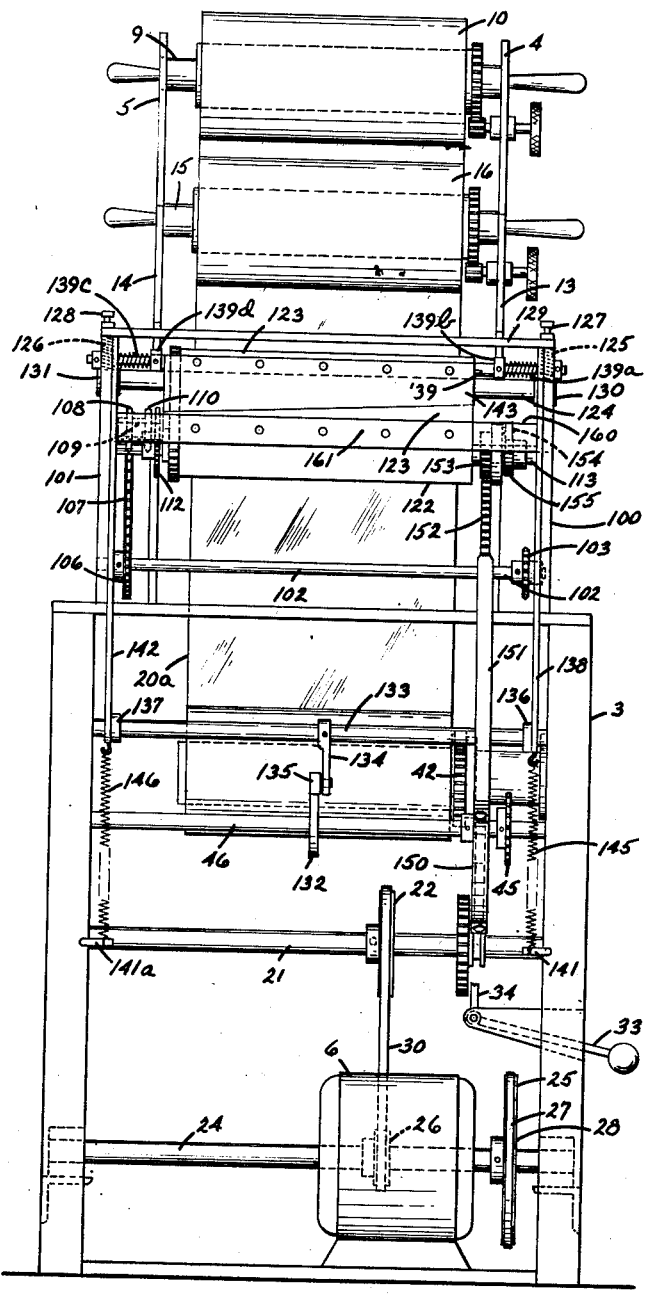
Figure 3 is a left side elevation view of Figure 1.

Referring to Figures 1 to 3 of the drawing, the apparatus comprises a main supporting frame 3 extending upwardly from which is a superstructure comprising the side plates, panels or members 4 and 5. Mounted at the base of the apparatus is a drive motor 6. In the grooves 7 and 8 of the plate-like members 4 and 5 there is removably mounted a shaft 9 which carries the roll of cellophane 10. In the grooves 11 and 12 in the brackets 13 and 14 fastened to the members 4 and 5 respectively, there is mounted the shaft 15 which carries the cellophane roll 16.

Mounted on the brackets 17 and 18 which are fastened to the machine frame 3 is a shaft 19 which carries the roll of cellophane 20. Extending transverse of the machine frame 3 is a shaft 21 on which is mounted the pulley 22 and a driving gear 23. Also mounted transversely of the machine on the brackets 17 and 18 is a shaft 24 which has mounted thereon pulleys 25 and 26. Pulley 25 is connected by the belt 27 to the pulley 28 on the shaft 29 of the driving motor 6. The pulley 26 is connected to pulley 22 on the shaft 21 by the belt 30.

Mounted on the bracket 31 which extends inwardly of the machine frame 3 and is fastened thereto, is a shaft 32 to which is keyed the lever 33 extending outwardly of the machine frame 3. Also, an upwardly extending lever 34 is keyed to the shaft 32 terminating in a yoke 35 having rollers 36 on the terminal portions thereof which ride in the groove 37 of the gear 23.

Mounted above the shaft 21 and also fastened to the brackets 17 and 18 and extending inwardly of the machine, is a shaft 38. Mounted on shaft 38 is a gear 39 having attached thereto a sprocket 40. A second gear 41 is also mounted on the end of shaft 38. The gears 39 and 41 are rotatably mounted on the shaft 38 but are not keyed thereto. In mesh with the gear 41 is a gear 42 mounted on the roll support 43 which carries the roll 20.

The sprocket 40 is connected by the chain 44 to a sprocket 45 mounted on the shaft 46 which in turn is mounted on the machine frame 3 and extends transversely thereof.

The sheet of cellophane 20a from roll 20 passes upwardly over the guide roll 47 fastened to the plate-like members 4 and 5. The sheet 20a then passes under the roller 48 which is mounted in the blocks 49 and 50, slidably mounted in the openings 51 and 52 in members 4 and 5 respectively. Fastened to the blocks 49 and 50 and threadably mounted therein are the cylindrical members 53 and 54 which extend upwardly in the openings 51 and 52 and through the plate or bracket 55 which is fastened to members 4 and 5 and extends transversely of the machine. The members 53 and 54 terminate in the bearings 56 and 57 mounted on the shaft 58. Extending between the block 49 and the bracket 55 and wrapped about the member 53 is a compression spring 59, there being a similar spring 60 wrapped about the member 54 and extending between the block 50 and the bracket 55.

Fastened to the shaft 58 are two cam blocks 61 and 62 positioned at either end thereof and keyed to the shaft 58. Also keyed to the shaft 58 is an outwardly extending lever 63 which has a cam follower or roller 64 on the outer end thereof. A hand lever 65 is keyed to the shaft 58 and extends upwardly therefrom, as shown particularly in Figures 1 and 2.

The cam follower 64 rides on the cam 66 which in turn is mounted on the shaft 67 extending outwardly from the plate 4. Also mounted on the shaft 67 is a sprocket 68 which is connected by the chain 69 to a sprocket 70 mounted on the shaft 71 which also extends outwardly from the plate 4 (see Figure 2).

Removably mounted in the openings or slots 72 and 73 in the members 4 and 5 respectively, is a shaft 74 having the glue applying wheels or discs 75 fastened thereto and spaced by means of the collars 76. To the outer end of the shaft 74 there is fastened a gear 77 which is in mesh with a gear 78 mounted on the shaft 79 which extends outwardly from the member 4. Also fastened to the shaft 79 is a sprocket 80.

Figure 5:
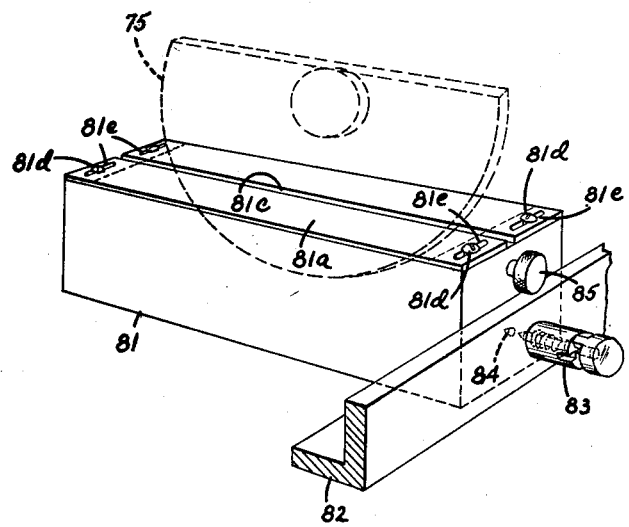
Figure 5 is a perspective view of one of the adhesive or glue pots showing the locking means therefor and in outline, the adhesive applying wheel or disc associated therewith.

The glue applying wheels or discs 75 extend downwardly into the glue pots or containers 81, there being ten of such pots shown in the embodiment in the drawing. The glue pots are held in position on the transversely extending supporting bracket 82 by means of the locking pins 83 which rest against the pots 81 in the grooves 84 therein (see Figure 5). Also attached to the glue pots 81 are the hand knobs 85 which are employed when removing and replacing the glue pots in the apparatus. Referring to Figure 5, each glue or adhesive pot 81 has two adjustable cover plates 81a and 81b forming the top or cover thereof. The plates are adjusted so as to leave an opening 81c in the top of the pot for the insertion of a disc 75 therein. The plates are brought in juxtaposed relation to the disc 75 and act as scrapers therefor. The plates are adjusted by means of the screws 81d positioned in the slots 81e of the plates. The cover plates are easily removable when filling the pots with adhesive or cleaning the pots.

Extending downwardly from the member or supporting bracket 82 are the brackets 86 and 87 which in turn are connected by the links 88 and 89 to the levers 90 and 91. The levers 90 and 91 terminate in the sector gears 92 and 93 respectively and are mounted on the supporting bracket 94 with the sector gears in mesh. Fastened to the shaft 95 to which the sector gear 92 is also fastened, there is fastened a hand lever 96. Thus by rotating the hand lever 96 in a clockwise direction, as viewed in Figure 2, the plate or bracket 82 may be raised thus raising the glue pots into contact with the glue applying discs or wheels 75. A hook 96a, pivotally mounted on the machine frame 3, is employed to hold the handle 96 in raised position, as shown in Figure 2. In order to regulate the distance which the glue pots may be elevated, adjustable stops, 97 and 97a supported on the members 4 and 5 respectively by means of the angle iron brackets 98 and 99 are provided. These stops 97 and 97a prevent the further upward movement of the glue pots by contacting the supporting bracket 82.

Attached to the machine frame 3 and extending upwardly therefrom are the supporting plate-like brackets or panels 100 and 101 positioned at the end of the machine opposite to that to which the brackets 4 and 5 are attached (see Figures 1 and 3). Mounted in the brackets 100 and 101 is a shaft 102. Mounted on the shaft 102 is a sprocket 103 which is connected by the chain 104 to the sprocket 80 mounted on the shaft 79. It is to be noted that the chain 104 also contacts or is in mesh with a sprocket 105 mounted on the shaft 71. Also mounted on the shaft 102 is a sprocket 106 which is connected by the chain 107 to a sprocket 108 mounted on the shaft 109 which is in turn mounted on the members 100 and 101. Also mounted on the shaft 109 is a second sprocket 110 which is connected by the chain 111 to a sprocket 112 mounted on the shaft 113 which is in turn also mounted on the members 100 and 101.

Figure 4:
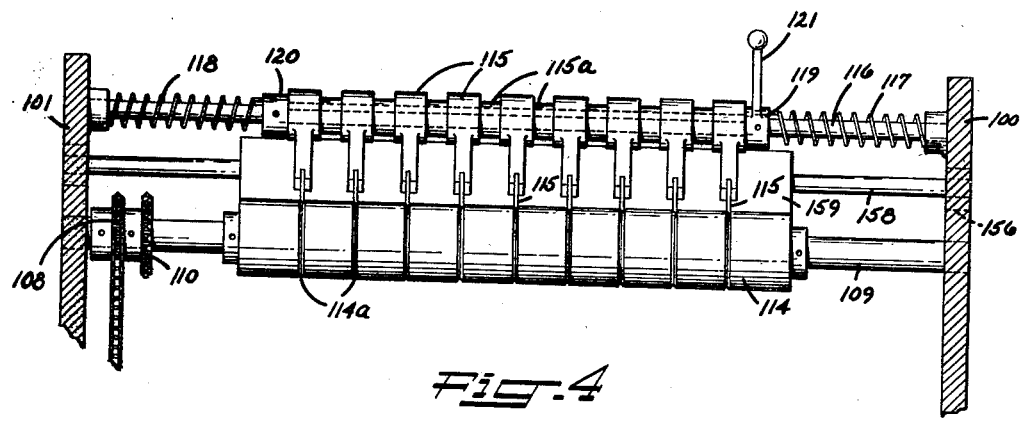
Figure 4 is a view taken on the line IV—IV of Figure 1.

The shaft 109 carries the slitting roll 114 or the roll against which the slitting knives rest, the slitting knives 115 being positioned on the shaft 116 mounted on the members 100 and 101 (see Figure 4). The knives are positioned on shaft 116 by the spacing collars 115a which are keyed to adjacent knives. The knives are held against the surface of the roll 114 in the grooves 114a therein, by reason of the springs 117 and 118 wound about the shaft 116 and fastened to the member 100 and the collar 119 on the shaft 116 and the member 101 and the collar 120 on the shaft 116 (see Figure 4). A lever 121 is fastened to the collar 119 and extends upwardly therefrom. The lever 121 is for the purpose of raising the knives 115 out of contact with the roll 114 when desired.

Mounted on the shaft 113 is a draw roller 122. Positioned directly above the draw roller 122 is a second draw roller 123 which is mounted on the shaft 124 and is pressed downwardly against the roller 122 by reason of the compression springs 125 and 126 wrapped about the rods 127 and 128 which extend from the transverse supporting member 129 down to the blocks 130 and 131 which act as bearings for the shaft 124.

Mounted on the shaft 46 in approximately the center position thereof is a cam 132. A shaft 133 is mounted on the machine frame 3 and extends transversely of the machine. Keyed to the shaft 133 is a lever 134 having a roller or cam follower 135 at the outer end thereof in contact with the cam 132. Keyed to either end of the shaft 133 are outwardly extending levers 136 and 137. Attached to the end of lever 136 and pivotably connected thereto is a second upwardly extending lever 138 which is fastened at its upper end to the shaft 139 slidably mounted in the slot 140 in the plate or member 100. Lever 137 is likewise pivotably connected to the upwardly extending lever 142 which is connected to the shaft 139, the shaft being mounted in a slot in the member 101 similar to that in member 100. The shaft 139 carries the guillotine knife blade 143. The knife blade 143 is held in position by reason of the spring 139a encircling shaft 139 and fastened to member 100 and the collar 139b keyed to shaft 139, and the spring 139c encircling shaft 139 and fastened to member 101 and collar 139d keyed to shaft 139. Attached between the lever 136 and the projection 141 extending outwardly from the machine frame 3 is a tension spring 145 there being a similar spring 146 attached between lever 137 and the projection 141a extending outwardly from the machine frame 3.

Mounted on the shaft 46 is an eccentric disc 147 fastened to the periphery of which is a yoke or eccentric strap 150. Attached to the yoke 150 is a connecting rod 151 which extends upwardly therefrom and has attached to the upper end thereof a rack 152. The rack 152 is in mesh with a gear 153 rotatably mounted on the shaft 113. Attached to the gear 153 is a pawl 154 which on the upward stroke of the rack 152 engages a ratchet 155 keyed to the shaft 113.

Fastened to the members or brackets 100 and 101 are brackets 156 which extend outwardly toward the brackets 4 and 5 mounted on the other end of the machine. Mounted in the brackets 156 and 157 is a shaft 158 which carries a guide roller 159. Fastened to the opposite ends of the brackets or members 100 and 101 to that which the guide roller 159 is attached, is a transversely extending block 160 fastened to the outer face of which is a knife blade 161 which cooperates with the reciprocating blade 143. Also fastened to the block 160 is a platform-like tray 162 which receives the slit samples from the machine. In order to prevent the samples from sliding out of the tray 162, a removable tray 163 having a backing 164 is placed inside the side walls of the tray 162 resting on the bottom thereof. It is to be noted that block 160 is so shaped as to form a platform over which the sealed or laminated samples can slide as they emerge from between the draw rollers 122 and 123 and pass to the receiving or collecting means 162.

Extending transversely of the path of travel of the film and mounted on the members 4 and 5 is a shaft 165 which carries or supports a guide roller 166. A supporting rod 167 is also fastened between the members 4 and 5.

Each of the rollers or rolls of cellophane or like material, have tensioning devices associated therewith in order to prevent the film from dragging as it passes through the machine or from becoming too loose so that there may be a sudden tension on the film thus causing the same to break or become damaged. These tension devices comprise a rotatable member 168 which extends into the core 169 such as shown in Figure 2 in connection with the roll of cellophane 10. Fastened to the member 168 is a gear 169a which is in mesh with a gear 170 on the shaft 171 fastened in suitable bearings in the member 4. Also fastened to the shaft 171 is a handwheel 172 which is positioned on the outside of the machine and readily accessible to the operator. By merely turning the hand-wheel 172, and thus the gear 169a, in either one direction or the other, the tension on the roll 10 may be suitably regulated. Like devices, such as that just described, are employed in connection with each of the rolls of cellophane, namely rolls 16 and 20.

With respect to the following description of the operation of the apparatus, reference should be had to all of the figures of the drawing. The rolls of cellophane which are to be sealed together are mounted on the shafts 19 and 9. The roll of cellophane 16 mounted on the shaft 15 serves merely as a slip sheet to be positioned between successive samples coming from the apparatus in order to prevent the striking through of adhesive from one sample to the next, should that phenomenon occur. The cellophane sheet 20a from the roll 20 is directed over the guide roll 47, around the roller 48 and thence under the guide roll 159, over the slitting roll 114 and between the draw rollers 122 and 123 which also serve as pressure rollers. The cellophane sheets 16a and 10a from the rolls 16 and 10 respectively are directed together around the guide roll 166 thus bringing sheet 10a into contact with sheet 20a. Sheets 10a and 16a are likewise directed under the guide roll 159, over the roll 114 and between the draw rollers 122 and 123.

At the start of operations, the glue pots are raised to the position shown in Figure 2 and the roll 48 lowered into contact with the adhesive applying discs 75 and with the cam follower 64 resting on the surface of cam 66. The motor 6 is started thus driving the shaft 24 and shaft 21 continuously by means of the pulleys 22 and 26 and the belt 30 therebout. In operation the lever 33 is pushed downwardly thus bringing the gear 23 in mesh with the gear 39 which causes the sprocket 40 to be driven continuously and likewise the shaft 46 by reason of the chain 44 and sprocket 45.

Each time that shaft 46 makes one complete revolution, so does the eccentric disc 147 which causes the connecting rod 151 to go up and then come back down with each revolution. As the connecting rod 151 goes up, the gear 153 is rotated by the rack 152 and by reason of the pawl contacting the ratchet 155 the shaft 113 and the draw roller 122 are likewise rotated in a counterclockwise direction as viewed in Figure 1. By reason of the draw roller 122 being in contact with the film, or rather the films between it and the draw roller 123, the film is pulled through the apparatus. At the same time, roller 114 and shaft 102 are rotated in a counterclockwise direction as viewed in Figure 1. Through the action of the chain 104 and sprockets 105 and 30, the shaft 74 carrying the adhesive applying disc 75 is rotated in a clockwise direction as viewed in Figure 1. Thus the glue applying discs 75 make rolling contact with the sheet of cellophane 20a passing over the roller 48. At the same time, through the action of the chain 69, the cam 66 is rotated in a counterclockwise direction and as the raised portion 66a of cam 66 contacts the cam follower 64, it causes the roll 48 to be momentarily raised thus bringing the sheet 20a out of contact with the adhesive applying discs 75 which naturally causes a break in the application of adhesive to the film.

While shaft 46 is making one complete revolution, so also is the cam 132. When the depression 132a in the periphery of the cam 132 comes into contact with the cam follower 135 it allows the springs 145 and 146 to pull the shaft 139 and thus the blade 143 thereon in a downward direction into cutting contact with the lower blade 161 thus cutting off the sealed samples which have passed therebetween. All of these actions are so timed that the samples are cut transversely in the space or break in the application of adhesive which break or space was caused through the action of the cam 66. Thus intermittently at predetermined intervals a series of ten sealed samples, each one being sealed with a different adhesive, emerges from the machine. The draw rollers 122 and 123 also serve as pressure rollers to insure a good even seal. As the superposed films with the adhesive between films 20a and 10a, pass over the roll 114 they are slit or cut longitudinally by the slitting blades 115 which rest in suitable grooves on the surface of roll 114. The films are cut or slit between adjacent applications of adhesive. The sheet 16a which is on top of the emerging sealed samples acts as a slip sheet or a protective sheet between successive sealed samples chambers emerging from the machine.

Any convenient number of adhesives may be applied to a film in the present apparatus as desired. The length of the samples which emerge from the machine may be regulated by the speed of the motor, the size of the gears and sprockets employed, and likewise the size of the cams employed and in particular cam 66. All of these adjustments will be apparent to one skilled in the art.

The glue pots 81 are removably mounted in the supporting structure 82. When it is desired to remove the same in order to clean them or to change the adhesive employed in any single one of the pots, the lever 96 is rotated in a counterclockwise direction as viewed in Figure 2. This brings the glue pots down out of contact with the adhesive applying disc 75. At the same time the lever 65 is rotated in a clockwise direction as viewed in Figure 1 which causes the cam blocks 61 and 62 to likewise rotate thus in turn causing the roll 48 to be lifted up out of contact with the discs 75. The spring actuated locking members 83 are pulled outwardly and turned slightly to prevent them going back toward the glue pot and then by grasping the knob 85 the glue pot may be readily lifted from the supporting bracket 82.

When it is desired to employ a thermoplastic coated sheet of film in the present apparatus, such as a coated sheet of cellophane, the glue or adhesive applying discs will become heated members and may be heated by any suitable means well known in the art. In this instance, however, the second roll of cellophane 10 would have to be mounted adjacent the roll 20 and both the sheets 20a and 10a directed over the guide roll 47 into contact with the heated members or discs 75. In many instances heat would be sufficient to seal such thermoplastic materials but should pressure also be required the roll 48 could be under sufficient tension so that it and the disc would act as pressure rollers while at the same time applying heat to the film. Any other changes, such as readjustment of mechanical parts would be readily within the skill of the art.

In testing a roll of sheet material in order to get uniform and reproducible results, it is preferable that the roll of cellophane 10 be identical with the roll of cellophane 20. In order to insure this identity, the apparatus is so constructed that a master roll of cellophane may be placed on the shaft 9 and directed down around the core mounted on the shaft 19 and then the cellophane on the roll 10 unwound or partially unwound on the roll 20. This is accomplished by raising the lever 33 upwardly as shown in Figure 2 thus bringing the gear 23 in contact or in mesh with the gear 41 which is in turn in mesh with the gear 42 mounted on the shaft 19. This causes the roll 20 to be driven in a clockwise direction as viewed in Figure 1 thus unwinding the film 10a from the roll 10. In this way, the same film may be used in both the sheets necessary to form the individual samples.

The present apparatus may be run at any desired speed by merely placing a variable speed pulley on the shaft 29 of motor 6. By means of the present invention any number of adhesives may be applied to a sheet or film in order to form individual samples for testing thus saving a considerable amount of material which has heretofore been necessary in testing these adhesives. In addition, a great deal of time is saved since heretofore it has been necessary to test each adhesive individually and the preparation of samples for such testing has been extremely tedious and time consuming. Numerous other advantages of the present invention will be apparent to those skilled in the art.

It is to be understood that changes and variations may be made without departing from the spirit and scope of the invention as defined in the appended claims.

I claim:

1. An apparatus for adhesively joining sheet materials with a plurality of adhesives comprising means for mounting two rolls of sheet material to be sealed together, sheet material drawing means, guiding means for directing the sheets through individual paths and then as a laminar assembly through a common path to the drawing means, adhesive-applying means adjacent the individual path of one of the sheets for applying a plurality of adhesives to the sheet in separate areas spaced apart laterally across the sheet, means for periodically directing the sheet into contact with the adhesive-applying means, slitting means comprising at least one slitting element positioned adjacent the common path, each slitting element being located between adjacent adhesively-joined strips of the laminar assembly, transverse cutting means adjacent the common path and following the drawing means along the path, and means for periodically actuating the cutting means.

2. An apparatus for adhesively joining sheet materials with a plurality of adhesives comprising means for mounting two rolls of sheet material to be sealed together, sheet material drawing means, guiding means for directing the sheets through individual paths and then as a laminar assembly through a common path to the drawing means, adhesive-applying means adjacent the individual path of one of the sheets for applying a plurality of adhesives to the sheet in separate areas spaced apart laterally across the sheet, means for periodically directing the sheet into contact with the adhesive-applying means, slitting means comprising at least one slitting element positioned adjacent the common path, each slitting element being located between adjacent adhesively-joined strips of the laminar assembly, transverse cutting means adjacent the common path and following the drawing means along the path, means for periodically actuating the cutting means, and receiving means adjacent the cutting means for collecting the cut laminated sheet material.

3. An apparatus as defined in claim 2 wherein the drawing means comprises means for drawing a predetermined length of the sheet materials through the apparatus at predetermined intervals.

4. An apparatus as defined in claim 2 wherein the guiding means comprises rollers over which the sheets pass.

5. An apparatus as defined in claim 2 wherein the drawing means comprises a pair of pressure rollers between which the sheets pass.

6. An apparatus as defined in claim 2 wherein the adhesive-applying means comprises a plurality of adhesive pots spaced apart transversely of the individual path of the sheet, a shaft extending transversely of the path and positioned above the pots, and a plurality of rotatable discs spaced on the shaft, each of said discs extending into one of the adhesive pots.

7. An apparatus for adhesively joining sheet materials with a plurality of adhesives comprising means for mounting two rolls of sheet material to be sealed together, sheet material drawing means comprising a pair of pressure rollers between which the sheets pass, roller guiding means for directing the sheets through individual paths and then as a laminar assembly through a common path to the drawing means, adhesive-applying means adjacent the individual path of one of the sheets for applying a plurality of adhesives to the sheet in separate areas spaced apart laterally across the sheet, means for periodically directing the sheet into contact with the adhesive-applying means, slitting means comprising a plurality of slitting knives positioned adjacent the common path and preceding the drawing means along the path, each slitting knife being located between adjacent adhesively-joined strips of the laminar assembly, transverse cutting means adjacent the common path and following the drawing means along the path, means for periodically actuating the cutting means, and receiving means adjacent the cutting means for collecting the cut laminated sheet material.

8. An apparatus as defined in claim 7 wherein the adhesive-applying means comprises a plurality of adhesive pots spaced apart transversely of the individual path of the sheet, a shaft extending transversely of the path and positioned above the pots, and a plurality of rotatable discs spaced on the shaft, each of said discs extending into one of the adhesive pots.

9. An apparatus as defined in claim 7 wherein there are means for periodically and intermittently rotating the pressure rollers in one direction.

10. An apparatus for adhesively joining sheet materials with a plurality of adhesives comprising means for mounting a plurality of rolls of sheet material, sheet material drawing means comprising a pair of pressure rollers between which the sheets pass, means for periodically and intermittently rotating the pressure rollers in one direction, roller guiding means for directing the sheets through individual paths and then as a laminar assembly through a common path to the drawing means, adhesive-applying means adjacent the individual path of one of the sheets for applying a plurality of adhesives to the sheet in separate areas spaced apart laterally across the sheet, said adhesive-applying means comprising a plurality of adhesive pots spaced apart transversely of the individual path of the sheet, a shaft extending transversely of the path and positioned above the pots, and a plurality of rotatable discs spaced on the shaft, each of said discs extending into one of the adhesive pots, means for periodically directing the sheet into contact with the adhesive-applying means, slitting means comprising a plurality of slitting knives positioned adjacent the common path and preceding the drawing means along the path, each slitting knife being located between adjacent adhesively-joined strips of the laminar assembly, transverse cutting means adjacent the common path and following the drawing means along the path, means for periodically actuating the cutting means, and receiving means adjacent the cutting means for collecting the cut laminated sheet material.

11. An apparatus as defined in claim 10 wherein the means for periodically and intermittently rotating the pressure rollers in one direction comprises a gear rotatably mounted on the shaft of one of the pressure rollers, a ratchet keyed to the shaft, a pawl attached to the gear in contact with the ratchet, and a reciprocating rack in mesh with the gear.

12. An apparatus as defined in claim 10 wherein the means for periodically directing the sheet into contact with the adhesive-applying means comprises a roller about which the sheet passes which is mounted movably toward and away from the rotatable discs, and cam means for moving the roller.

13. An apparatus as defined in claim 10 wherein the means for actuating the cutting means comprises lever means attached to the cutting means, a continuously rotating shaft, and a cam keyed to the shaft, said cam being in contact with the lever means.

14. An apparatus for adhesively joining sheet materials with a plurality of adhesives comprising means for mounting a plurality of rolls of sheet material, sheet material drawing means comprising a pair of pressure rollers between which the sheets pass, means for periodically and intermittently rotating the pressure rollers in one direction comprising a gear rotatably mounted on the shaft of one of the pressure rollers, a ratchet keyed to the shaft, a pawl attached to the gear in contact with the ratchet, and a reciprocating rack in mesh with the gear, roller guiding means for directing the sheets through individual paths and then through a common path to the drawing means, adhesive-applying means adjacent the individual path of one of the sheets for applying a plurality of adhesives to the sheet in separate areas spaced apart laterally across the sheet, said adhesive-applying means comprising a plurality of adhesive pots spaced apart transversely of the individual path of the sheet, a shaft extending transversely of the path and positioned above the pots, and a plurality of rotatable discs spaced on the shaft, each of said discs being spaced apart on the shaft and extending into one of the adhesive pots, means for periodically directing the sheet into contact with the adhesive-applying means, the last-named means comprising (1) a roller about which the sheet passes which is mounted movably toward and away from the rotatable discs and (2) cam means for moving the roller, slitting means comprising a plurality of slitting knives positioned adjacent the common path and preceding the drawing means along the path, each slitting knife being located between adjacent adhesively-joined strips of the laminar assembly, transverse cutting means adjacent the common path and following the drawing means along the path, means for periodically actuating the cutting means, and receiving means adjacent the cutting means for collecting the cut laminated sheet material.

15. An apparatus for adhesively joining sheet materials with a plurality of adhesives comprising means for mounting a plurality of rolls of sheet material, sheet material drawing means comprising a pair of pressure rollers between which the sheets pass, means for periodically and intermittently rotating the pressure rollers in one direction, roller guiding means for directing the sheets through individual paths and then as a laminar assembly through a common path to the drawing means, adhesive-applying means adjacent the individual path of one of the sheets for applying a plurality of adhesives to the sheet in separate areas spaced apart laterally across the sheet, said adhesive-applying means comprising a plurality of adhesive pots spaced apart transversely of the individual path of the sheet, a shaft extending transversely of the path and positioned above the pots, and a plurality of rotatable discs spaced apart on the shaft, each of said discs extending into one of the adhesive pots, means for periodically directing the sheet into contact with the adhesive-applying means, the last-named means comprising (1) a roller about which the sheet passes which is mounted movably toward and away from the rotatable discs and (2) cam means for moving the roller, slitting means comprising a plurality of slitting knives positioned adjacent the common path and preceding the drawing means along the path, each slitting knife being located between adjacent adhesively-joined strips of the laminar assembly, transverse cutting means adjacent the common path and following the drawing means along the path, means for periodically actuating the cutting means comprising (1) lever means attached to the cutting means, (2) a continuously rotating shaft, and (3) a cam keyed to the shaft, said cam being in contact with the lever means, and receiving means adjacent the cutting means for collecting the cut laminated sheet material.

16. An apparatus as defined in claim 15 wherein the means for periodically and intermittently rotating the pressure rollers in one direction comprises a gear rotatably mounted on the shaft of one of the pressure rollers, a lever keyed to the shaft, a pawl attached to the gear in contact with the ratchet, and a reciprocating rack in mesh with the gear.

References Cited in the file of this patent

UNITED STATES PATENTS

| Number | Name | Date |
|---|---|---|
| 237,055 | Shackleton | Jan. 25, 1881 |
| 345,474 | Bacon | July 13, 1886 |
| 2,205,433 | Paulsen | June 25, 1940 |
| 2,290,386 | Schindler | July 21, 1942 |
| 2,622,999 | Faussner | Dec. 23, 1952 |